United States Patent Office 2,868,775
Patented Jan. 13, 1959

2,868,775

METALLIZABLE AZO DYES PREPARED FROM BENZOTHIAZOLES AND HYDROXY-THIANAPH-THENES

James M. Straley and Ralph R. Giles, Kingsport, Tenn., assignors to Eastman Kodak Company, Rochester, N. Y., a corporation of New Jersey No Drawing. Application April 15, 1957
Serial No. 652,701

13 Claims. (Cl. 260—146)

This invention relates to certain metallizable azo dyes and to their metallized complexes.

The non-metallized dyes within the scope of this invention have the structural formula:

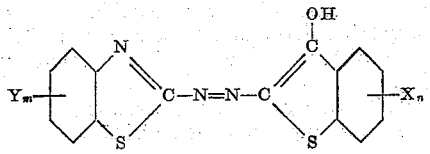

wherein Y is a substituent radical selected from the group consisting of lower alkyl containing 1 to 4 carbon atoms, nitro, cyano, halogen, alkoxy containing 1 to 4 carbon atoms, thiocyano, hydroxyalkyl, containing 1 to 4 carbon atoms, alkylsulfonyl containing 1 to 4 carbon atoms, hydroxyalkylthio containing 1 to 4 carbon atoms, cyanoalkylthio containing 1 to 4 carbon atoms, acetamido, haloalkyl containing 1 to 4 carbon atoms, cyanoalkylsulfonyl containing 1 to 4 carbon atoms and alkylthio containing 1 to 4 carbon atoms, X is a substituent radical selected from the group consisting of halogen, lower alkyl containing 1 to 4 carbon atoms and alkoxy containing 1 to 4 carbon atoms, $m$ is an integer from 0 to 2 and $n$ is an integer from 0 to 3.

The non-metallized dyes that are within the scope of this invention are prepared by diazotizing either 2-aminobenzothiazole or a substituted 2-aminobenzothiazole. When the aminobenzothiazole contains substituent radicals, those substituent radicals are selected from the group set forth for Y in the above structural formula. The resulting diazo compound is then reacted or coupled with either 3-hydroxythianaphthene or a substituted 3-hydroxythianaphthene. When the hydroxythianaphthene contains any substituent radicals, those substituent radicals are selected from the group set forth for X in the above structural formula. One method of carrying out the diazotization reaction involves dissolving the amino compound in an aqueous hydrochloric acid solution and then adding sodium nitrite. The details of the diazotization reaction are set forth in the specific examples and the procedures described in those examples represent methods by which the diazotization reaction can be carried out.

The non-metallized dyes, after their preparation, are reacted with a metal salt, such as suitable salts of nickel, cobalt, copper, chromium, manganese, iron or vanadium. The non-metallized azo compounds can be metallized either on or off the materials they color. Metallization can be carried out, for example, by treating the non-metallized azo compound with a solution or dispersion of the metallizing agent. Although the metal complex is often formed at room temperature, we prefer to accelerate the process by heating, usually with steam, for a short period of time. The metallization is effected by procedures well known to those skilled in the art to which this invention is directed.

Illustrative of the metallizing agents that can be employed are the halides, the sulfates, the acetates, the cyanides and the thiocyanates of nickel, cobalt, chromium, manganese, iron and vanadium as well as various copper compounds. Thus, nickel chloride, nickel bromide, nickel sulfate, nickel acetate, nickel cyanide, nickel formate, nickel thiocyanate $[Ni(SCN)_2]$, cobaltous bromide, cobaltic chloride, cobaltous chloride, cobaltous acetate, cobaltous cyanide, cobalt thiocyanate $[Co(SCN)_2]$, cupric chloride, cupric bromide, cupric acetate, cupric lactate, chromium trichloride, chromium tribromide, chromic sulfate, chromic acetate, chromium thiocyanate $[Cr(SCN)_3]$, manganese chloride, manganous sulfate, manganese acetate, manganese thiocyanate $[Mn(SCN)_2]$, ferric chloride, ferric fluoride, ferrous acetate, ferrous thiocyanate $[Fe(SCN)_2]$, ferric thiocyanate $[Fe(SCN)_3]$, and vanadium thiocyanate $[V(SCN)_2]$ are illustrative of the metallizing agents that can be employed.

The non-metallized monazo compounds described herein are useful for the dyeing of cellulose alkyl carboxylic acid esters having 2 to 4 carbon atoms in the acid groups thereof, nylon, sulfone polyesters, polyethylene terephthalate and polyacrylonitrile. After application to these materials, usually in the form of textile materials, the dye is metallized thereon. The metallized azo compounds of our invention can be applied by ordinary dyeing or printing techniques to nitrogenous textile materials such as wool, silk, nylon and acrylonitrile polymers, for example. Coloration can also be effected by incorporating the non-metallized or metallized azo compounds into the spinning dope, spinning the fiber as usual and converting the non-metallized azo compounds to their metallized form. Also the metallizing agent can be incorporated in the spinning dope, the fiber spun as usual and then dyed with the non-metallized monoazo compounds to form the metal complex on the fiber. The new metallized dyes of our invention are preferably formed by heating the non-metallized azo dye with the metallizing agent in organic solvents such as, for example, cellulose acetate, cellulose acetate-propionate, acrylonitrile polymers, polyamides, methyl cellosolve and formamide.

As is well known, one of the disadvantages dyed cellulose acetate textile fabrics suffer in comparison with some of the dyed competing textile fabrics, such as cotton, wool and viscose, for example, is lack of fastness to washing. Many schemes have been proposed to remedy this situation but all suffer from some significant fault. By means of our invention, dyed cellulose acetate textile materials having good-to-excellent fastness to washing, light and gas are obtainable. These results may be obtained by dyeing the cellulose acetate textile material with the non-metallized azo compounds and then treating the dyed cellulose acetate textile material with suitable metal salts which cause the original dye to form metallic complexes which are resistant, for example, to the action of washing, light and gas. These results can also be obtained by incorporating the metallized azo dye into the cellulose acetate spinning dope and spinning the fiber as usual. Thus, by means of the present invention, the disadvantage noted above with respect to the wash fastness of dyed cellulose acetate textile materials is either entirely or largely overcome. Cellulose acetate has been particularly referred to because it is the most widely used cellulose alkyl carboxylic acid ester.

When the metal complex is formed on a cellulose alkyl carboxylic acid ester, such as cellulose acetate fiber, the use of a metal thiocyanate appears to be advantageous and is preferred. Nickel thiocyanate appears to be especially useful and particular claim is laid to its use. Next to nickel thiocyanate the use of cobalt thiocyanate is preferred.

Metallization will be described in detail with reference to nickel and cobalt inasmuch as the metallized dyes containing these materials in complex combination appear to be advantageous. However, it will be clearly understood that the non-metallized azo compounds can be metallized with the other metals disclosed herein. The azo compounds disclosed herein have varying utility as dyes. The degree of utility varies, for example, depending upon the material being colored and the actual dye employed.

The following examples are illustrative of this invention:

Example 1

5.7 g. of 2-amino-6-methylsulfonylbenzothiazole were slurried in 60 cc. of water. 55 cc. of $H_2SO_4$ were added with evolution of heat. The solution was cooled to $-10°$ C. and diazotized by addition of 2.1 g. $NaNO_2$ in 13 cc. concentrated $H_2SO_4$ below 5° C. After all was added, the mix was stirred two hours longer below 5° C. and run into a solution of 4.5 g. of 6-ethoxy-3-hydroxythianaphthene in 75 cc. of 1:5 acid below 5° C. The cooling bath was removed and the mix allowed to stir 2 hours. The mineral acid was then neutralized to Congo with ammonium acetate and the coupling poured into 1000 cc. of water. The dye was isolated by filtering, washed acid free with water, and dried at 60° C. The yield was 8.5 g. of material which dyes cellulose acetate in yellow shades and which has the formula:

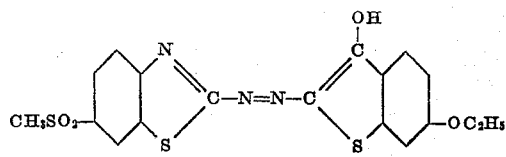

Example 2

A dye was prepared according to the procedure of Example 1 using as the coupler 5 g. of 4-methyl-3-hydroxythianaphthene. The product imparts yellow shades to cellulose acetate.

Example 3

4.85 g. (0.025 m.) of 2-amino-6-β-hydroxyethylbenzothiazole were suspended in 65 cc. of water and 37 cc. of concentrated $H_2SO_4$ added. The solution was cooled to $-5°$ C. and a solution of 2.1 g. $NaNO_2$ in 12.5 cc. concentrated $H_2SO_4$ added with stirring, keeping the temperature below 5° C. The solution was stirred 2 hours longer and then run into a solution of 3.8 g. of 3-hydroxythianaphthene in 250 cc. of water containing 10 g. NaOH, keeping the temperature below 10° C. by addition of ice. The mineral acid was neutralized to Congo by addition of ammonium acetate and the coupling stirred without further cooling for 2 hours. The dye was isolated by filtration, washed and dried. The yield was 7.5 g. of material which dyes cellulose acetate in bright yellow shades and which has the formula:

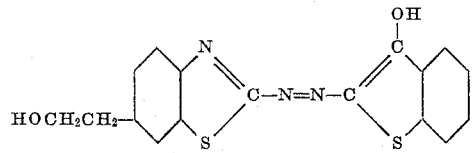

Example 4

9.7 g. (0.05 m.) of 2-amino-6-ethoxybenzothiazole were added to a solution prepared by adding 3.8 g. $NaNO_2$ in 25 cc. $H_2SO_4$ to 50 cc. of mixed propionic-acetic acid (1:5) below 5° C. with good stirring. The mix was stirred 2 hours longer at 0–5° C., after adding 50 cc. more of 1:5 acid. The diazo solution thus prepared was run into a solution of 10 g. of 6-chloro-4-methyl-3-hydroxythianaphthene in 150 cc. of 1:5 acid below 10° C. The mineral acid was neutralized to Congo with ammonium acetate and allowed to couple 2 hours longer without further cooling. The product was isolated by drowning in water, filtered, washed and dried. There was thus obtained 17 g. of product which dyes cellulose acetate in orange shades.

Example 5

The dye of Example 1 was metallized on cellulose acetate fiber using nickel thiocyanate, obtaining bright red-violet shades of good resistance to the action of light and laundering.

The cobalt complexes were somewhat yellower and duller than those obtained using nickel.

Example 6

The dye of Example 2, when metallized on cellulose acetate using nickel thiocyanate, yielded much bluer shades (of excellent fastness properties) than those obtained in Example 5. Again the cobalt complexes were redder and duller than the nickel complexes.

Example 7

The dye of Example 3 was metallized on cellulose acetate using nickel thiocyanate, obtaining deep blue dyeings of excellent fastness properties. The cobalt complex was redder and duller. The metallized dye obtained using nickel thiocyanate as the metallizing agent is believed to have the formula:

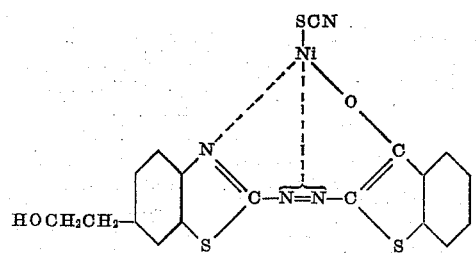

Example 8

The dye of Example 4 was metallized on cellulose acetate using nickel thiocyanate, obtaining deep blue prints of good resistance to light and washing.

Example 9

1 g. of the product of Example 3 was refluxed and stirred in 20 cc. acetone. 3 cc. of 28% $NH_4OH$ were added, followed by a solution of 0.8 g. nickelous acetate crystals in 20 cc. of acetone. After 3–4 hours refluxing and stirring the mix was drowned in 400 cc. of water. The pigment was isolated by filtering, washing, and drying. When incorporated in cellulose acetate, it yielded beautiful bright blue yarn of excellent fastness properties.

Other dyes within the scope of this invention are shown in the following table.

| 2-Aminobenzo-thiazole | 3-Hydroxy-thianaphthene | Metal Used | Color Original | Color Final |
|---|---|---|---|---|
| 6-Bromo | Unsubstituted | Ni | orange | violet. |
|  |  | Co | do | Do. |
| 5-Methoxy | do | Ni | do | blue. |
|  |  | Co | do | violet. |
| 6-Methylsulfonyl | do | Ni | do | red-violet. |
|  |  | Co | do | Do. |
| Do | 5,7-Dimethyl | Ni | yellow | Do. |
|  |  | Co | do | Do. |
| Do | 6-Chloro-4-methyl | Ni | do | Do. |
|  |  | Co | do | maroon. |
| 6-Nitro | do | Ni | do | violet. |
|  |  | Co | do | Do. |
| 6-Methoxy | 5,6,7-Trichloro | Ni | tan | grey. |
|  |  | Co | do | Do. |
| 6-Methylsulfonyl | do | Ni | do | violet. |
|  |  | Co | do | Do. |
| 5,6-Dimethoxy | do | Ni | do | grey. |
|  |  | Co | do | Do. |
| Unsubstituted | 6-Ethoxy | Ni | yellow | violet. |
|  |  | Co | do | maroon. |
| 6-β-Hydroxy-ethylthio | do | Ni | orange | blue. |
|  |  | Co | do | navy. |
| 6-β-Cyanoethylthio | do | Ni | do | blue. |
|  |  | Co | do | violet. |
| 6-Cyanomethylthio | do | Ni | yellow | Do. |
|  |  | Co | do | brown. |
| 6-Thiocyano | do | Ni | do | violet. |
|  |  | Co | do | red-violet. |
| 6-Acetamido | do | Ni | do | blue. |
|  |  | Co | do | grey. |
| 4,6-Dimethyl | do | Ni | do | brown. |
|  |  | Co | do | Do. |
| 6-Trifluoromethyl | do | Ni | do | red-violet. |
|  |  | Co | do | grey. |
| 6-Methyl | do | Ni | do | violet. |
|  |  | Co | do | Do. |
| 6-β-Cyano-ethyl-sulfonyl | do | Ni | do | red-violet. |
|  |  | Co | do | Do. |
| 6-Methylthio | do | Ni | do | blue. |
|  |  | Co | do | navy. |

We claim:

1. As a composition of matter, the azo compounds selected from the group consisting of the monoazo compounds and their metal complexes containing a metal selected from the group consisting of chromium, cobalt, copper, iron, manganese, nickel and vanadium, said monoazo compounds having the structural formula:

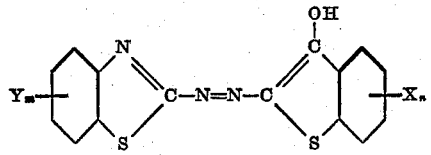

wherein Y is a substituent radical selected from the group consisting of lower alkyl containing 1 to 4 carbon atoms, nitro, halogen, alkoxy containing 1 to 4 carbon atoms, thiocyano, hydroxyalkyl containing 1 to 4 carbon atoms, alkylsulfonyl containing 1 to 4 carbon atoms, hydroxyalkylthio containing 1 to 4 carbon atoms, cyanoalkylthio containing 1 to 4 carbon atoms, acetamido, haloalkyl containing 1 to 4 carbon atoms, cyanoalkylsulfonyl containing 1 to 4 carbon atoms and alkylthio containing 1 to 4 carbon atoms, X is a substituent radical selected from the group consisting of halogen, lower alkyl containing 1 to 4 carbon atoms and alkoxy containing 1 to 4 carbon atoms, $m$ is an integer from 0 to 2 and $n$ is an integer from 0 to 3.

2. As a composition of matter, the azo compounds having the structural formula:

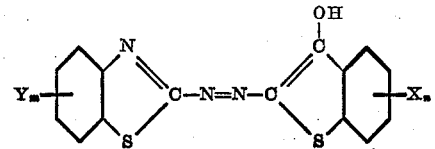

wherein Y is a substituent radical selected from the group consisting of lower alkyl containing 1 to 4 carbon atoms, nitro, halogen, alkoxy containing 1 to 4 carbon atoms, thiocyano, hydroxyalkyl containing 1 to 4 carbon atoms, alkylsulfonyl containing 1 to 4 carbon atoms, hydroxyalkylthio containing 1 to 4 carbon atoms, cyanoalkylthio containing 1 to 4 carbon atoms, acetamido, haloalkyl containing 1 to 4 carbon atoms, cyanoalkylsulfonyl containing 1 to 4 carbon atoms and alkylthio containing 1 to 4 carbon atoms, X is a substituent radical selected from the group consisting of halogen, lower alkyl containing 1 to 4 carbon atoms and alkoxy containing 1 to 4 carbon atoms, $m$ is an integer from 0 to 2 and $n$ is an integer from 0 to 3.

3. As a composition of matter, a complex metal compound containing a metal selected from the group consisting of chromium, cobalt, copper, iron, manganese, nickel and vanadium in complex combination with the monoazo compounds having the formula set forth in claim 2.

4. As a composition of matter, the azo compound having the structural formula:

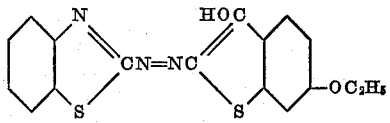

5. As a composition of matter, the azo compound having the structural formula:

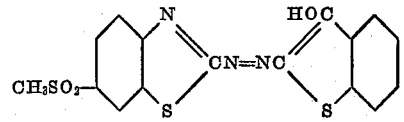

6. As a composition of matter, the azo compound having the structural formula:

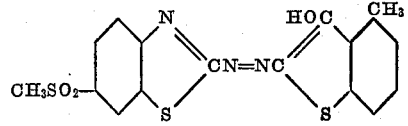

7. As a composition of matter, the azo compound having the structural formula:

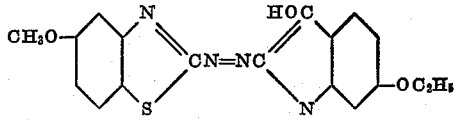

8. As a composition of matter, the azo compound having the structural formula:

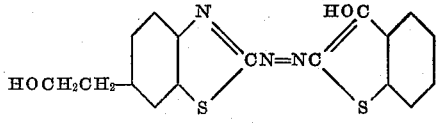

9. As a composition of matter, the nickel complex of the azo compound having the formula set forth in claim 4.

10. As a composition of matter, the nickel complex of the azo compound having the formula set forth in claim 5.

11. As a composition of matter, the nickel complex of the azo compound having the formula set forth in claim 6.

12. As a composition of matter, the nickel complex of the azo compound having the formula set forth in claim 7.

13. As a composition of matter, the nickel complex of the azo compound having the formula set forth in claim 8.

No references cited.

UNITED STATES PATENT OFFICE
Certificate of Correction

Patent No. 2,868,775 January 13, 1959

James M. Straley et al.

It is hereby certified that error appears in the printed specification of the above numbered patent requiring correction and that the said Letters Patent should read as corrected below.

Column 6, lines 46 to 51, inclusive, claim 7, the formula should read as shown below instead of as in the patent:

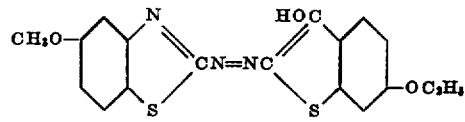

Signed and sealed this 21st day of April 1959.

[SEAL]

Attest:
KARL H. AXLINE,
*Attesting Officer.*

ROBERT C. WATSON,
*Commissioner of Patents.*